(12) United States Patent
Kim et al.

(10) Patent No.: US 10,626,292 B2
(45) Date of Patent: Apr. 21, 2020

(54) COATING COMPOSITION FOR FLEXIBLE PLASTIC FILM

(71) Applicant: LG CHEM, LTD., Seoul (KR)

(72) Inventors: Hye Min Kim, Daejeon (KR); Jin Young Park, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 160 days.

(21) Appl. No.: 15/744,699

(22) PCT Filed: Aug. 3, 2016

(86) PCT No.: PCT/KR2016/008573
§ 371 (c)(1),
(2) Date: Jan. 12, 2018

(87) PCT Pub. No.: WO2017/023120
PCT Pub. Date: Feb. 9, 2017

(65) Prior Publication Data
US 2018/0208793 A1      Jul. 26, 2018

(30) Foreign Application Priority Data

Aug. 3, 2015 (KR) .................. 10-2015-0109700
Nov. 16, 2015 (KR) .................. 10-2015-0160673
Aug. 1, 2016 (KR) .................. 10-2016-0098074

(51) Int. Cl.
| | | |
|---|---|---|
| C09D 175/06 | (2006.01) | |
| C08F 290/06 | (2006.01) | |
| C08F 290/14 | (2006.01) | |
| G02B 1/14 | (2015.01) | |
| C09D 133/06 | (2006.01) | |
| C09D 151/08 | (2006.01) | |
| C09D 4/06 | (2006.01) | |
| C09D 7/40 | (2018.01) | |
| C08L 75/14 | (2006.01) | |
| C09D 7/62 | (2018.01) | |
| C08J 7/04 | (2020.01) | |
| C09D 133/08 | (2006.01) | |
| C09D 7/61 | (2018.01) | |
| C08K 9/06 | (2006.01) | |
| C08K 3/36 | (2006.01) | |

(52) U.S. Cl.
CPC ........ *C09D 175/06* (2013.01); *C08F 290/067* (2013.01); *C08F 290/147* (2013.01); *C08J 7/047* (2013.01); *C08L 75/14* (2013.01); *C09D 4/06* (2013.01); *C09D 7/40* (2018.01); *C09D 7/62* (2018.01); *C09D 7/67* (2018.01); *C09D 7/68* (2018.01); *C09D 133/06* (2013.01); *C09D 133/08* (2013.01); *C09D 151/08* (2013.01); *G02B 1/14* (2015.01); *C08J 2379/08* (2013.01); *C08J 2433/08* (2013.01); *C08J 2475/04* (2013.01); *C08J 2475/06* (2013.01); *C08K 3/36* (2013.01); *C08K 9/06* (2013.01); *C08K 2201/003* (2013.01); *C08K 2201/011* (2013.01); *C08K 2201/014* (2013.01); *C09D 7/61* (2018.01); *C09D 7/66* (2018.01)

(58) Field of Classification Search
CPC ...... C09D 175/06; C09D 133/08; C09D 7/67; C09D 7/62; C09D 7/68; C08J 2475/06; C08J 7/047; C08J 2379/08
USPC .......................................................... 524/493
See application file for complete search history.

(56) References Cited

U.S. PATENT DOCUMENTS

| | | |
|---|---|---|
| 2006/0105132 A1 | 5/2006 | Katoh et al. |
| 2006/0132025 A1 | 6/2006 | Gao et al. |
| 2006/0147674 A1 | 7/2006 | Walker, Jr. et al. |
| 2007/0286993 A1 | 12/2007 | Radcliffe et al. |
| 2010/0087611 A1 | 4/2010 | Urakawa et al. |
| 2010/0173093 A1 | 7/2010 | Radcliffe et al. |
| 2010/0248576 A1 | 9/2010 | Fukuda et al. |
| 2011/0151146 A1 | 6/2011 | Okano et al. |
| 2011/0183120 A1 | 7/2011 | Sharygin et al. |
| 2011/0206900 A1 | 8/2011 | Iwase |
| 2011/0217541 A1 | 9/2011 | Shimano et al. |
| 2011/0318567 A1 | 12/2011 | Hildenbrand et al. |
| 2013/0216818 A1 | 8/2013 | Kim et al. |

(Continued)

FOREIGN PATENT DOCUMENTS

| | | |
|---|---|---|
| CN | 1772820 A | 5/2006 |
| CN | 101204697 A | 6/2008 |

(Continued)

OTHER PUBLICATIONS

Miramer MU 9800, Miwon, technical datasheet, Dec. 18, 2017. (Year: 2017).*

(Continued)

*Primary Examiner* — Hui H Chin

(74) *Attorney, Agent, or Firm* — Rothwell, Figg, Ernst & Manbeck, P.C.

(57) ABSTRACT

The present invention relates to a coating composition for a flexible plastic film, and more specifically to a coating composition for producing a flexible plastic film having excellent flexibility while exhibiting high hardness. According to the present invention, the coating composition exhibits flexibility, bending property, high hardness, scratch resistance and high transparency, and hardly has a risk of damaging the film even in repetitive, continuous bending or long-time folding state, and thereby can be usefully applied to flexible mobile devices, display devices, front face and display unit of various instrument panels, and the like.

7 Claims, 3 Drawing Sheets

(56) References Cited

U.S. PATENT DOCUMENTS

| | | |
|---|---|---|
| 2013/0260138 A1 | 10/2013 | Shen et al. |
| 2013/0274366 A1 | 10/2013 | Jin |
| 2013/0295390 A1 | 11/2013 | Yamamoto et al. |
| 2014/0065326 A1 | 3/2014 | Lee et al. |
| 2015/0140279 A1 | 5/2015 | Kang et al. |
| 2015/0197662 A1 | 7/2015 | Kang et al. |
| 2015/0234097 A1 | 8/2015 | Kang et al. |
| 2015/0299504 A1 | 10/2015 | Kang et al. |
| 2015/0299507 A1 | 10/2015 | Kang et al. |
| 2015/0322223 A1 | 11/2015 | Woo et al. |
| 2015/0353760 A1 | 12/2015 | Bae et al. |
| 2016/0024330 A1 | 1/2016 | Jung et al. |
| 2016/0032137 A1 | 2/2016 | Kang et al. |
| 2016/0145449 A1* | 5/2016 | Hilgers .................. C09D 4/06 428/327 |
| 2016/0282902 A1 | 9/2016 | Kang et al. |
| 2016/0297178 A1 | 10/2016 | Kang et al. |
| 2017/0369712 A1 | 12/2017 | Lim et al. |
| 2018/0148578 A1 | 5/2018 | Ohta et al. |

FOREIGN PATENT DOCUMENTS

| | | |
|---|---|---|
| CN | 101790695 A | 7/2010 |
| CN | 103013324 A | 4/2013 |
| CN | 104199128 A | 12/2014 |
| CN | 104619790 A | 5/2015 |
| JP | 3033445 B2 | 4/2000 |
| JP | 2006-036835 A | 2/2006 |
| JP | 2008089969 A | 4/2008 |
| JP | 2010-082860 A | 4/2010 |
| JP | 2010085760 A | 4/2010 |
| JP | 2010-174201 A | 8/2010 |
| JP | 2012030532 A | 2/2012 |
| JP | 2013-064038 A | 4/2013 |
| JP | 2013-154631 A | 8/2013 |
| JP | 5320848 B2 | 10/2013 |
| JP | 2014-030910 A | 2/2014 |
| JP | WO2014022363 * | 2/2014 |
| JP | 2014079974 A | 5/2014 |
| JP | 5541457 B2 | 7/2014 |
| JP | 2014529762 A | 11/2014 |
| JP | 2015-0003516 A | 1/2015 |
| JP | 2015-038189 A | 2/2015 |
| JP | 2015-060963 A | 3/2015 |
| JP | 2015-112670 A | 6/2015 |
| JP | 2015-123721 A | 7/2015 |
| JP | 2016-155124 A | 9/2016 |
| JP | 2016-188354 A | 11/2016 |
| KR | 10-0199552 B1 | 6/1999 |
| KR | 10-0390478 B1 | 7/2003 |
| KR | 10-20040018147 A | 3/2004 |
| KR | 10-2008-0023641 A | 3/2008 |
| KR | 10-20080061703 A | 7/2008 |
| KR | 10-20090021166 A | 2/2009 |
| KR | 10-20090044089 A | 5/2009 |
| KR | 10-20090057597 A | 6/2009 |
| KR | 10-20100041992 A | 4/2010 |
| KR | 10-20110021916 A | 3/2011 |
| KR | 10-20110043444 A | 4/2011 |
| KR | 10-20110052656 A | 5/2011 |
| KR | 10-20110111768 A | 10/2011 |
| KR | 10-20110124232 A | 11/2011 |
| KR | 10-1127952 B1 | 3/2012 |
| KR | 10-20120097866 A | 9/2012 |
| KR | 10-1227551 B1 | 1/2013 |
| KR | 10-20130074830 A | 7/2013 |
| KR | 10-20130097229 A | 9/2013 |
| KR | 10-2013-0135156 A | 12/2013 |
| KR | 10-20130135152 A | 12/2013 |
| KR | 10-20140024216 A | 2/2014 |
| KR | 10-20140027024 A | 3/2014 |
| KR | 10-20140033546 A | 3/2014 |
| KR | 1020140027023 A | 3/2014 |
| KR | 10-1391241 B1 | 5/2014 |
| KR | 10-20140058762 A | 5/2014 |
| KR | 10-1411006 B1 | 6/2014 |
| KR | 10-1415841 B1 | 7/2014 |
| KR | 10-20140104175 A | 8/2014 |
| KR | 10-1443845 B1 | 9/2014 |
| KR | 10-20140113423 A | 9/2014 |
| KR | 10-20140114292 A | 9/2014 |
| KR | 10-1472895 B1 | 12/2014 |
| KR | 10-20140147567 A | 12/2014 |
| KR | 10-20150000729 A | 1/2015 |
| KR | 10-20150040310 A | 4/2015 |
| KR | 10-20150058066 A | 5/2015 |
| KR | 10-20150058067 A | 5/2015 |
| KR | 10-20150072549 A | 6/2015 |
| KR | 10-1537845 B1 | 7/2015 |
| KR | 10-2016-0114339 A | 10/2016 |
| WO | 2009005975 A1 | 1/2009 |
| WO | 2012-160894 A1 | 11/2012 |
| WO | 2013-180510 A1 | 12/2013 |
| WO | 2014-022368 A2 | 2/2014 |
| WO | 2014022363 A2 | 2/2014 |
| WO | 2014-088272 A1 | 6/2014 |
| WO | 2014-100300 A1 | 6/2014 |
| WO | 2014-129768 A1 | 8/2014 |
| WO | 2014142581 A1 | 9/2014 |
| WO | 2014-208323 A1 | 12/2014 |
| WO | 2014207103 A1 | 12/2014 |
| WO | 2015-076566 A1 | 5/2015 |
| WO | 2015108834 A1 | 7/2015 |
| WO | 2016-186013 A1 | 11/2016 |

OTHER PUBLICATIONS

Etercure 6195-100, Eternal Materials, technical datasheet, Dec. 18, 2017. (Year: 2017).*
Extended Search Report issued for European Patent Application No. 16833355.7 dated May 28, 2018, 6 pages.
Extended Search Report issued for European Patent Application No. 16833353.2 dated May 29, 2018, 9 pages.
Extended Search Report issued for European Patent Application No. 16833354.0 dated May 29, 2018, 8 pages.
Extended Search Report issued for European Patent Application No. 16833356.5 dated May 29, 2018, 6 pages.
Zetasizer Nano ZS for size, zeta potential, protein mobility and microrheology, 7 pages, retrieved from <https://www.malvernpanalytical.com/en/products/product-range/zetasizer-range/zetasizer-nano-range/zetasizer-nano-zs> on Jun. 4, 2018.
International Search Report and Written Opinion issued in PCT/KR2016/008572, dated Nov. 1, 2016, 10 pages.
International Search Report and Written Opinion issued in PCT/KR2016/008573, dated Nov. 4, 2016, 11 pages.
International Search Report and Written Opinion issued in PCT/KR2016/008570, dated Oct. 12, 2016, 12 pages.
International Search Report and Written Opinion issued in PCT/KR2016/008571, dated Nov. 1, 2016, 10 pages.

* cited by examiner

COATING COMPOSITION FOR FLEXIBLE PLASTIC FILM

CROSS-REFERENCE TO RELATED APPLICATION(S)

The present application is a 35 U.S.C. 371 National Phase Entry Application from PCT/KR2016/008573, filed Aug. 3, 2016, which claims the benefit of priority based on Korean Patent Application No. 10-2015-0109700 filed on Aug. 3, 2015, Korean Patent Application No. 10-2015-0160673 filed on Nov. 16, 2015 and Korean Patent Application No. 10-2016-0098074 filed on Aug. 1, 2016 with the Korean Intellectual Property Office, the disclosures of which are incorporated herein by reference in their entirety.

CROSS-REFERENCE TO RELATED APPLICATION(S)

The present application claims the benefit of priority based on Korean Patent Application No. 10-2015-0109700 filed on Aug. 3, 2015, Korean Patent Application No. 10-2015-0160673 filed on Nov. 16, 2015 and Korean Patent Application No. 10-2016-0098074 filed on Aug. 1, 2016 with the Korean Intellectual Property Office, the disclosures of which are incorporated herein by reference in their entirety.

BACKGROUND OF THE INVENTION (a) Field of the Invention

The present invention relates to a coating composition for a flexible plastic film. More specifically, the present invention relates to a coating composition for producing a flexible plastic film having excellent flexibility while exhibiting high hardness.

(b) Description of the Related Art

Recently, with the development of mobile devices such as smartphones and tablet PCs, thinning and slimming of substrates for display are required. Glass or tempered glass is commonly used as a material having excellent mechanical properties on windows or front boards for displays of mobile devices. However, the glass causes the weight increase of the mobile devices due to its own weight, and has a problem of breakage due to an external impact.

Therefore, plastic resin is being studied as a substitute for glass. The plastic resin composition is lightweight but hardly has a risk of cracking and thus are suitable for the trend of pursuing lighter mobile devices. In particular, in order to implement a film having high hardness and abrasion resistance properties, a composition for coating a hard coating layer made of a plastic resin onto a support substrate has been proposed.

As a method of improving the surface hardness of the hard coating layer, a method of increasing the thickness of the hard coating layer can be considered. In order to ensure the surface hardness enough to replace the glass, it is necessary to implement a thickness of a certain hard coating layer. However, as the thickness of the hard coating layer is increased, the surface hardness may be increased but the occurrence of wrinkles and curls are increased due to curing shrinkage of the hard coating layer, and at the same time cracking and peeling of the coat layer are likely to occur. Therefore, the practical application of this method is not easy.

Korean Patent Laid-Open Publication No. 2010-0041992 discloses a plastic film composition using a binder resin containing an ultraviolet-curable polyurethane acrylate-based oligomer and eliminating monomers. However, the plastic film disclosed above has insufficient strength to replace a glass panel of a display with a pencil hardness of about 3H.

Meanwhile, a display in which a part of the display device is bent or flexibly warped for aesthetic and functional reasons has recently been attracting attention, and this tendency is noticeable particularly in mobile devices such as smartphones and tablet PCs. However, since glass is not suitable for use as a cover plate for protecting such a flexible display, it needs to be replaced with a plastic resin or the like. However, for that purpose, it is not easy to produce a thin film having sufficient flexibility while exhibiting a glass level of high hardness.

SUMMARY OF THE INVENTION

It is an object of the present invention to provide a coating composition capable of producing a flexible plastic film having excellent flexibility while exhibiting high hardness.

In order to achieve the above object, the present provides a coating composition comprising:
a 3- to 6-functional acrylate-based binder;
a 7- to 20-functional urethane acrylate-based binder;
a photoinitiator; and
inorganic fine particles having a bimodal particle size distribution including a first inorganic fine particle group having $d_{50}$ of 20 to 35 nm and a second inorganic fine particle group having $d_{50}$ of 40 to 130 nm.

The coating composition according to the present invention exhibits flexibility, bending property, high hardness, scratch resistance and high transparency, and hardly has of damaging the film even in repetitive, continuous bending or long-time folding state. Therefore, the coating composition can be usefully applied to bendable, flexible, rollable or foldable mobile devices, display devices, front face and display unit of various instrument panels, and the like.

DETAILED DESCRIPTION OF THE EMBODIMENTS

Figure 1:
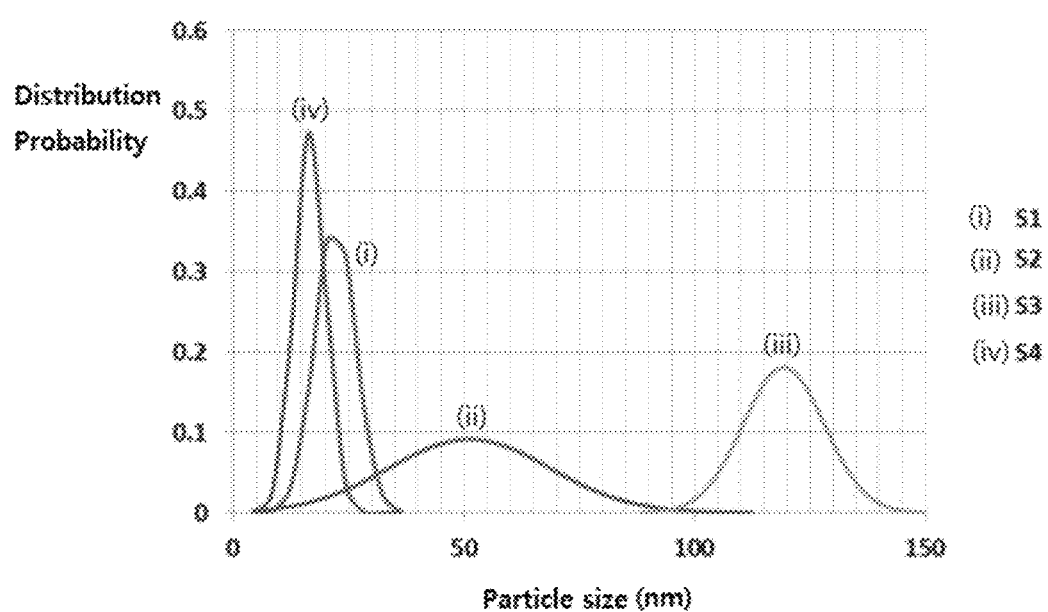
FIG. 1 is a graph showing the particle size distribution of the first and second inorganic fine particle groups according to one embodiment of the present invention.

The coating composition of the present invention comprises: a 3- to 6-functional acrylate-based binder; a 7- to 20-functional urethane acrylate-based binder; a photoinitiator; and inorganic fine particles having a bimodal particle size distribution including a first inorganic fine particle group having $d_{50}$ of 20 to 35 nm and a second inorganic fine particle group having $d_{50}$ of 40 to 130 nm.

In the present invention, the terms such as first, second, etc. are used to describe various components, and the terms are used only for the purpose of distinguishing one component from another component.

Moreover, the terminology used herein is for the purpose of describing exemplary embodiments only and is not intended to limit the present invention. The singular expression includes plural expressions unless the context clearly indicates otherwise. It will be understood that the terms such as "comprise," "include," "have," etc. as used herein specify the presence of stated features, integers, steps, components, or combinations thereof but do not preclude the presence or addition of one or more other features, integers, steps, components, and/or combinations thereof.

As the present invention allows for various changes and numerous embodiments, particular embodiments will be illustrated and described in detail below. However, this is not intended to limit the present invention to particular modes of practice, and it is to be appreciated that all changes, equivalents, and substitutes that do not depart from the spirit and technical scope of the present invention are encompassed in the present invention.

The coating composition of the present invention will be described in more detail below.

The coating composition according to an embodiment of the present invention comprises: a 3- to 6-functional acrylate-based hinder; a 7- to 20-functional urethane acrylate-based binder; a photoinitiator; and inorganic fine, particles having a bimodal particle size distribution including a first inorganic fine particle group having $d_{50}$ of 20 to 35 nm and a second inorganic fine particle group having $d_{50}$ of 40 to 130 nm.

First, the coating composition of the present invention includes a 3- to 6-functional acrylate-based binder.

As used herein, the acrylate-based means not only acrylate but also methacrylate, or derivatives in which a substituents are introduced into acrylate or methacrylate.

The 3- to 6-functional acrylate-based binder is cross-linked with the 7- to 20-functional urethane acrylate-based hinder to form a copolymer, and can impart high hardness to the coating layer formed after curing.

More specifically, the 3- to 6-functional acrylate-based binder may include trimethylolpropane triacrylate (TMPTA), trimethylolpropaneethoxy triacrylate (TMPEOTA), glycerin propoxylated triacrylate (GPTA), pentaerythritol tetraacrylate (PETA), dipentaerythritol hexaacrylate (DPHA), and the like, but the present invention is not limited thereto. The above-mentioned 3- to 6-functional acrylate-based binder may be used alone or in combination of different types.

According to one embodiment of the present invention, the 3- to 6-functional acrylate-based binder has a weight average molecular weight (Mw) ranging from about 200 to about 2,000 g/mol, or from about 200 to about 1,000 g/mol, or from about 200 to about 500 g/mol.

According to one embodiment of the present invention, the 3- to 6-functional acrylate-based binder has an acrylate equivalent weight ranging from about 50 to about 300 g/mol, or about 50 to about 200 g/mol, or about 50 to about 150 g/mol.

When the weight average molecular weight and the acrylate equivalent weight of the 3- to 6-functional acrylate-based binder are respectively within the above-mentioned ranges, a coating layer having more optimized physical properties can be formed.

The 3- to 6-functional acrylate-based binder can be contained in an amount of about 10 to about 50 parts by weight, or about 10 to about 40 parts by weight, or about 10 to about 30 parts by weight, based on 100 parts by weight of the entire coating composition. When content of the 3- to 6-functional acrylate-based binder is too small, the hardness of the coating layer can be lowered, and if the content is too high, the bending property or the flexibility may be deteriorated. From this viewpoint, it is desirable to include the binder in a ratio of the parts by weight described above.

The coating composition of the present invention includes a 7- to 20-functional urethane acrylate-based binder.

The 7- to 20-functional urethane acrylate-based binder is cross-linked with the 3- to 6-functional acrylate-based binder to form a copolymer, and may impart high hardness, flexibility and impact resistance to the coating layer formed after curing. The 7- to 20-functional urethane acrylate-based binder may be used alone or in combination of different types.

According to one embodiment of the present invention, the coating composition may contain the 3- to 6-functional acrylate-based binder and the 7- to 20-functional urethane acrylate-based binder in a ratio of about 1:9 to about 5:5, preferably 1:9 to about 4:6, more preferably from about 1:9 to about 3.5:6.5. By including the 3- to 6-functional acrylate-based binder and the 7- to 20-functional urethane acrylate-based binder in the weight ratio described above, it can exhibit sufficient flexibility and at the same time achieve high hardness and good physical properties.

According to one embodiment of the present invention, the 7- to 20-functional urethane acrylate-based hinder has a weight average molecular weight ranging from about 2,000 to about 8,000 g/mol, or from about 3,000 to about 6,000 g/mol, or from about 3,000 to about 5,000 g/mol, which may be preferable for the optimization of physical properties of the coating layer.

According to an embodiment of the present invention, the 7- to 20-functional urethane acrylate-based binder may have an acrylate equivalent weight ranging from about 200 to about 1,500 g/mol, or from about 200 to about 1,000 g/mol, or from about 300 to about 600 g/mol, or from about 300 to about 500 g/mol. If the acrylate equivalent weight of the 7- to 20-functional urethane acrylate-based binder is too high, the hardness of the coating layer may be insufficient, and if the equivalent weight is low, the hardness may be improved but the flexibility may be deteriorated. From the viewpoint of the balance between high hardness and flexibility as described above, the above-mentioned range of equivalent weight is preferable, and about 300 to about 500 g/mol may be most preferable.

When the weight average molecular weight and the acrylate equivalent weight of the 7- to 20-functional urethane acrylate-based binder are respectively within the ranges described above, coating layers having more optimized properties can be formed.

As the 7- to 20-functional urethane acrylate-based binder contains in the molecule at least 7 acrylate groups capable of performing a crosslinking polymerization by ultraviolet rays, it is advantageous for achieving high hardness of the coating layer. However, the higher the cross-linking density, it allows the curls to be easily generated and the adhesive force with the substrate is lowered, and so it is not suitable for forming a flexible film.

Meanwhile, the 7- to 20-functional urethane acrylate-based binder contained in the coating composition of the present invention includes at least 7 polyfunctional acrylate groups and at the same time has a urethane bond in the molecule, and thus is excellent in elasticity and flexibility. Accordingly, when it is cross-linked with a 3- to 6-functional acrylate-based binder at an appropriate weight ratio to form a copolymer, it serves to impart sufficient flexibility together with high hardness to the coating layer. The 7- to 20-functional urethane acrylate-based binder may contain 2 to 20 urethane bonds in one molecule.

As such, the coating composition of the present invention includes the 3- to 6-functional acrylate-based binder and the 7 to 20-functional urethane acrylate-based binder, thereby imparting high hardness and flexibility to the coating layer and the flexible plastic film formed 7 therefrom. In particular, it has high durability against bending, rolling or folding, and thus it is possible to secure excellent flexibility, which hardly has a risk of damaging the film even when repeatedly warped or folded for a long time.

The 7 to 20-functional urethane acrylate-based binder can be contained in an amount of about 40 to about 70 parts by weight, or about 40 to about 75 parts by weight, or about 40 to about 65 parts by weight, based on 100 parts by weight of the entire coating composition. When content of the 7- to 20-functional urethane acrylate-based binder is too small, the coating layer does not exhibit sufficient flexibility and thus the bending property may be deteriorated, and if the content is too high, the surface hardness of the coating layer may be lowered. From this viewpoint, it is desirable to include the binder in a ratio of the pails by weight described above.

The coating composition of the present invention includes a photoinitiator.

Examples of the photoinitiator may include 1-hydroxycyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio) phenyl]-2-(4-morpholinyl)-1-propanone diphenyl(2,4,6-trimethylbenzoyl)-phosphine oxide, or bis(2,4,6-trimethylbenzoyl)-phenylphosphine oxide, and the like, but are not limited thereto. In addition, examples of commercially available products include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators can be used alone or in combination of two or more.

The content of the photoinitiator is not particularly limited, but in order to achieve effective photopolymerization without impairing the physical properties of the entire coating composition, the photoinitiator may be contained in an amount of about 0.1 to about 5 parts by weight based on 100 parts by weight of the coating composition.

The coating composition of the present invention comprises inorganic fine particles having a bimodal particle size distribution including a first inorganic fine particle group having $d_{50}$ of 20 to 35 nm and a second inorganic fine particle group having $d_{50}$ of 40 to 130 nm. As described above, the coating composition of the present invention uses the inorganic fine particles exhibiting a bimodal particle size distribution including the first and second inorganic fine particle groups each having a specific range of $d_{50}$, thereby improving the hardness and flexibility of the coating layer simultaneously while maintaining the flexible property.

In the specification of the present invention, when a cumulative particle size distribution corresponding to particle sizes was measured using a laser light diffraction method (measurement method: size distribution by number is determined by using dynamic laser scattering, a solvent in which inorganic fine particles are dispersed, refractive index, viscosity, and dielectric constant of the inorganic fine particles, the equipment name: Malvern Zetasizer Nano-ZS 90), the particle size at the 10% cumulative is set to $d_{10}$, the particle size at the 50% cumulative to $d_{50}$, and the particle size at the 90% cumulative to $d_{90}$. The particle size distribution by the laser light diffraction method can show substantially the same distribution as that measured with SEM or TEM by diluting a dispersion liquid in which inorganic fine particles are dispersed in a solvent, or measured by analyzing the cross section of the coating layer containing the inorganic fine particles by SEM or TEM.

The first inorganic fine particle group having the small particle size range contributes to the improvement of the hardness, and the second inorganic fine particle group having the larger particle size range contributes to the improvement of bending property and flexibility. In this way, as other inorganic fine particle groups having different particle size ranges are mixed and used in addition to the cross-linked copolymer described above, it is possible to provide a coating layer in which the physical properties of hardness and flexibility are improved simultaneously. In addition, the hardness and flexibility may differ depending on the particle size distribution of the first and second inorganic fine particle groups, and when the first and second inorganic fine particle groups satisfying the predetermined particle size distribution are used, the physical property balance between the hardness and the flexibility of the coating layer may be optimized. The present invention has been completed on the basis of these facts.

As the first and second inorganic fine particle groups, for example, silica fine particles, aluminum oxide particles, titanium oxide particles, zinc oxide particles or the like may be each independently used.

According to one embodiment of the present invention, the $d_{50}$ of the first inorganic fine particle group may be 20 nm or more, or about 21 nm or more, 35 nm or less, 30 nm or less, or 25 nm or less, and the $d_{50}$ of the second inorganic fine particle group may be about 40 nm or more, or about 42 nm or more, or about 45 nm or more, and 130 nm or less, or 125 nm or less, or 120 nm or less.

According to one embodiment of the present invention, the first inorganic fine particle group may have $d_{10}$ of 10 to 19 nm, $d_{50}$ of 20 to 35 nm, and a $d_{90}$ of 25 to 40 nm. Further, the second inorganic fine particle group may have $d_{10}$ of 25 to 110 nm, $d_{50}$ of 40 to 130 nm, and $d_{90}$ of 60 to 150 nm.

According to one embodiment of the present invention, the content of the first inorganic fine particle group may be about 5 parts by weight or more, or about 10 parts by weight or more, or about 15 parts by weight or more, based on 100 parts by weight of the coating layer, in order to contribute to an improvement in high hardness. The content of the first inorganic fine particle group may be about 50 parts by weight or less, or about 45 parts by weight or less, or about 40 parts by weight or less, or about 35 parts by weight or less, in order to satisfy the flexibility. By including the first inorganic fine particle group within the weight range described above, it is possible to form a flexible plastic film having excellent physical properties simultaneously satisfying both high hardness and flexibility.

Further, according to one embodiment of the present invention, the content of the second inorganic fine particle group may be about 5 parts by weight or more, or about 10 parts by weight or more, or 15 parts by weight or more, based on 100 parts by weight of the entire coating layer, in order to contribute to an improvement in high hardness, and may be about 50 parts by weight or less, or about 45 parts by weight or less, or about 40 parts by weight or less, or about 35 parts by weight or less in order to satisfy flexibility. By including the second inorganic fine particle group within the weight range described above, it is possible to form a flexible plastic film having excellent physical properties simultaneously satisfying both high hardness and flexibility.

According to one embodiment of the present invention, the total content of the inorganic fine particles including the first and second inorganic fine particle groups may be about 25 parts by weight or more, or about 30 parts by weight or more, or about 35 parts by weight or more, based on 100 parts by weight of the entire coating layer, in order to contribute to an improvement in high hardness, and may be about 50 parts by weight or less, or about 45 parts by weight or less, or about 40 parts by weight or less in order to satisfy flexibility.

According to one embodiment of the present invention, the first and second inorganic fine particle groups may be the same or different and each independently surface-modified with any one or more silane coupling agents selected from the group consisting of (meth)acrylsilane, methacroxysilane, vinylsilane, epoxysilane, and mercaptosilane.

Since the first and second inorganic fine particle groups surface-modified with the silane coupling agent as described above can react with the acrylate group of the binder, the adhesion to the substrate is high, they can be uniformly dispersed in the coating layer, and the hardness can be improved without deteriorating the flexibility of the coating layer, which are therefore more advantageous.

According to one embodiment of the present invention, the first and second inorganic fine particle groups may be present in the weight ratio of about 9:1 to about 3:7, or about 8:2 to about 4:6, or about 7:3 to about 5:5. By including the first and second inorganic fine particle groups within the weight ratio range described above, it is possible to form a flexible plastic film having excellent physical properties with enhanced high hardness and flexibility.

The coating composition may optionally further include an organic solvent for proper fluidity and coating property.

Examples of the organic solvent include alcohol based solvents such as methanol, ethanol, isopropyl alcohol and butanol; alkoxy alcohol based solvents such as 2-methoxyethanol, 2-ethoxyethanol and 1-methoxy-2-propanol; ketone based solvents such as acetone, methyl ethyl ketone, methyl isobutyl ketone, methyl propyl ketone and cyclohexanone; ether based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether and diethylene glycol-2-ethylhexyl ether; aromatic solvent such as benzene, toluene and xylene, and the like. These may be used alone or in combination.

The content of the organic solvent is not particularly limited since it can be variously adjusted within a range that does not deteriorate the physical properties of the coating composition, but it can included so that the weight ratio of the solid content:organic solvent is about 30:70 to about 99:1. based on the solid content of the components contained in the coating composition. When the organic solvent is within the above range, it can have appropriate fluidity and coating property.

Meanwhile, the coating composition of the present invention may further include additives commonly used in the art, such as a surfactant, a UV absorber, a UV stabilizer, an anti-yellowing agent, a leveling agent, an antifouling agent, a dye for improving the color value, etc., in addition to the above-mentioned binder, inorganic fine particles, photoinitiator and organic solvent. Further, the content thereof is not particularly limited as it can be variously adjusted within the range that does not deteriorate the physical properties of the coating composition of the present invention. However, they may be contained in an amount of about 0.01 to 10 parts by weight based on about 100 parts by weight of the coating composition.

According to an embodiment of the present invention, for example, the coating composition may contain a surfactant as an additive, and the surfactant may be a mono- or bi-functional fluorine-based acrylate, a fluorine-based surfactant, or a silicon-based surfactant. In this case, the surfactant may be contained in a form of being dispersed or crosslinked in the crosslinked copolymer.

Further, the additive may include a UV absorber, a UV stabilizer, and examples of the UV absorber include a benzophenone-based compound, a benzotriazole-based compound, a triazine-based compound and the like. Examples of the UV stabilizer include tetramethyl piperidine or the like.

According to one embodiment of the present invention, the viscosity of the coating composition is not particularly limited as long as it has a suitable fluidity and coating property, and for example, it may have a viscosity of about 1,200 cps or less at a temperature of 25° C.

A coating composition comprising a 3- to 6-functional acrylate-based binder, a 7- to 20-functional urethane acrylate-based binder, inorganic fine particles having a bimodal particle size distribution including a first inorganic fine particle group having $d_{50}$ of 20 to 35 nm and a second inorganic fine particle group having $d_{50}$ of 40 to 130 nm, additives, and an organic solvent can be coated onto the substrate and then photo-cured to form a coating layer.

The plastic film including a coating layer formed by using the coating composition of the present invention as described above exhibits flexibility, bending property, high hardness, scratch resistance and high transparency, and the damage of the film is small even in repetitive, continuous bending or long-time folding state. Therefore, the plastic film can be usefully applied to bendable, flexible, rollable or foldable mobile devices, display devices, front face and display unit of various instrument panels, and the like.

In the present invention, "flexible" means a state having flexibility to such an extent that cracks of 3 mm or more in length do not occur when wound on a cylindrical mandrel with a diameter of 4 mm. Therefore, the flexible plastic film including a coating layer formed by using the coating composition of the present invention can be applied to a cover film of a bendable, flexible, rollable, or foldable display or the like.

The support substrate on which the coating layer is formed can be used without particularly limiting the method and material for producing the support substrate such as a stretched film or a non-stretched film as long as it is an optical transparent plastic resin having an elastic modulus of about 4 GPa or more as measured according to ASTM D882 and a thickness in the range of 2.0 to 200 μm so that it secures flexibility and hardness.

Among the conditions of the support substrate, the elastic modulus may be about 4 GPa or more, or about 5 GPa or more, or about 5.5 GPa or more, or about 6 GPa or more, and the upper limit value may be about 9 GPa or less, or about 8 GPa or less, or about 7 GPa or less. If the elastic modulus is less than 4 GPa, sufficient hardness cannot be achieved, and if the elastic modulus exceeds 9 GPa which is too high, it may be difficult to form a film having flexibility.

The thickness of the support substrate may be about 20 μm or more, or about 25 μm or more, or about 30 μm or more, and the upper limit value thereof may be about 200 μm or less, or about 150 μm or less, or about 100 or less. If the thickness of the support substrate is less than 20 μm, there is a possibility that breakage or curling occurs in the process of forming the coating layer, and it may be difficult to achieve high hardness. On the other hand, if the thickness exceeds 200 μm, the flexibility deteriorates and it may be difficult to form a flexible film.

From the viewpoint of ensuring the processability for the flexible film and achieving the balance of physical properties between the high hardness and the flexibility as described above, a support substrate having an elastic modulus of 4 GPa or more and 9 GPa or less and a thickness in the range of 20 to 200 μm can be used.

More specifically, according to one embodiment of the present invention, the support substrate satisfies the above-described elastic modulus and thickness range, and for example, it may be a film including polyimide (PI), polyimideamide, polyetherimide (PEI), polyethyleneterephthalate (PET), polyethylenenaphthalate (PEN), polyetheretherketone (PEEK), cyclic olefin polymer (COP), polyacrylate (PAC), polymethylmethacrylate (PMMA), triacetylcellulose (TAC), and the like. The above support substrate may have a single layer or a multilayer structure including, if necessary, two or more substrates composed of the same as or different substances, and is not particularly limited.

Alternatively, according to one embodiment of the present invention, the support substrate may be a substrate comprising polyimide (PI).

Further, according to one embodiment of the present invention, the thickness ratio between the support substrate and the coating layer on the both surfaces may be about 1:0.05 to about 1:1, or about 1:0.1 to about 1:0.8. When the thickness ratio between the support substrate and the coating layer is within the above range, a flexible plastic film exhibiting high hardness and flexibility can be formed more easily.

According to one embodiment of the present invention, the flexible plastic film may include a coating layer formed on at least one surface or both surfaces of the support substrate using the coating composition of the present invention.

The coating layer comprises a crosslinked copolymer of a 3- to 6-functional acrylate-based binder and a 7- to 20-functional urethane acrylate-based binder; and inorganic fine particles having a bimodal particle size distribution including a first inorganic fine particle group having $d_{50}$ of 20 to 35 nm and a second inorganic fine particle group having $d_{50}$ of 40 to 130 nm.

The coating composition may be each sequentially coated onto the front and rear surfaces of the support substrate, or simultaneously coated onto both surfaces of the support substrate.

According to one embodiment of the present invention, the coating composition comprising the above-described components can be coated onto both surfaces of the support substrate and then photo-cured to form a coating layer, thereby obtaining the flexible plastic film of the present invention. Here, the method of coating the coating composition is not particularly limited as long as it can be used in the technical field to which the present technology belongs, and for example, a bar coating method, a knife coating method, a roll coating method, a blade coating method, a die coating method, a micro gravure coating method, a comma coating method, a slot die coating method, a lip coating method, a solution casting method, or the like can be used.

The coating layer may have a thickness of about 3 μm or more, for example about 3 to about 20 μm, or about 3 to about 15 μm or about 3 to about 10 μm after being completely cured. According to the present invention, it is possible to provide a flexible plastic film having a high hardness when a coating layer having such a thickness is included.

According to one embodiment of the present invention, the flexible plastic film may further include at least one selected from a layer, a membrane, a film or the like such as a plastic resin film, a cohesive film, a release film, a conductive film, a conductive layer, a liquid crystal layer, a coating layer, a cured resin layer, a non-conductive film, a metal mesh layer or a patterned metal layer on the top surface of at least one coating layer or between the substrate film and the coating layer. For example, an antistatic layer having conductivity is first formed on a support substrate, and then a coating layer is formed thereon to provide an anti-static function, or a low refractive index layer is introduced on the coating layer to implement a low reflection function.

Further, the layer, membrane, film or the like may be in any form of a single layer, a double layer, or a laminate type. The layer, membrane, film or the like may be formed by laminating a freestanding film with an adhesive, a cohesive film, or the like, or may be laminated on the coating layer by a method such as coating, vapor deposition, sputtering, or the like, but the present invention is not limited thereto.

The flexible plastic film according to one embodiment of the present invention can be produced, for example, by the following method.

The flexible plastic film can be formed by a two-step process of first coating and first photo-curing a first coating composition on one surface of a support substrate, and then second coating and second photo-curing the coating composition on the other surface, that is the back side of the support substrate. At this time, the first and second coating compositions are the same as the above-described coating composition, and each of them distinguishes the composition coated onto only one surface and the back surface. In the case of forming the coating layer by this method, in the second photo-curing step, ultraviolet ray irradiation is performed not on the surface coated with the first coating composition but on the opposite surface, and thereby curls which may be generated due to curing shrinkage in the first photo-curing step can be cancelled out in opposite directions to obtain a flat flexible plastic film. Therefore, no additional flattening process is required.

However, the present invention is not limited thereto, and the curl balance can also be adjusted by forming the coating composition simultaneously on both surfaces of the support substrate and then curing the coating composition.

The flexible plastic film prepared by using the coating composition of the present invention exhibits excellent flexibility, bending property, high hardness, scratch resistance, high transparency, high durability and stability against bending, rolling or folding and thus can be used as a cover film of a next generation display having bendable, flexible, rollable or foldable properties, and the like.

For example, the flexible plastic film prepared by using the coating composition of the present invention exhibits flexibility to such an extent that cracks do not occur when wound on a cylindrical mandrel with a diameter of 4 mm or 3 mm.

Further, the flexible plastic film prepared by using the coating composition of the present invention may have a pencil hardness of 6H or more, or 7H or more, under a load of 750 g.

In addition, in the flexible plastic film prepared by using the coating composition of the present invention, when placing the film at an interval of 4 mm in the middle of the film, allowing the film to stand at room temperature while both sides of the film being folded at 90 degrees toward the bottom surface, and spreading the film on a flat bottom surface, the film may exhibit a bending stability to such an extent that a height lifted from the bottom surface is about 0.5 mm or less.

Further, in the flexible plastic film prepared by using the coating composition of the present invention, when placing the film at an interval of 4 mm in the middle of the film and repeating 100,000 times the processes of folding and spreading both sides of the film at 90 degrees toward the bottom surface, the film may exhibit a bending durability to such an extent that a crack of 1 cm or more or 3 mm or more does not occur.

Further, when steel wool #0000 is attached to a tip having a contact area of 2 cm×2 cm with respect to a plastic film in a friction tester and then the surface of the plastic film is reciprocated 400 times under a load of 500 g, 2 or less scratches can occur.

In addition, the flexible plastic film prepared by using the coating composition of the present invention may have a light transmittance of 88.0% or more, or 90.0% or more, and a haze of 1.5% or less, 1.0% or less, or 0.5% or less.

The flexible plastic film prepared by using the coating composition of the present invention can be utilized in various fields. For example, the flexible plastic film of the present invention can be used as a flat-shaped as well as a curved, bendable, flexible, rollable or foldable-shaped mobile communication terminal, a touch panel of a smartphone or a tablet PC, and cover substrate or element substrate of various displays.

Hereinafter, the operation and effect of the invention will be described in more detail by way of concrete examples. However, these examples are merely presented for illustrative purposes only, and the scope of the invention is not determined thereby.

EXAMPLES

Example 1

30 g of trimethylolpropane triacrylate (TMPTA) (manufactured by Cytec, Mw=296 g/mol, acrylate group equivalent weight=99 g/mol) as a trifunctional acrylate-based binder, 40 g of MU9800 (manufactured by Miwon, Mw=3500 g/mol, acrylate group equivalent weight=389 g/mol) as a 9-functional urethane acrylate-based binder, 30 g of MU9020 (manufactured by Miwon, Mw=4500 g/mol, acrylate group equivalent weight=450 g/mol) as a 10-functional urethane acrylate-based binder, 1 g of Irgacure 184 (manufactured by Ciba) as a photoinitiator, and 15 g of methyl ethyl ketone (MEK) were mixed to prepare an acrylate solution.

60 g of a solution in which a silica particle S ($d_{10}$=17 nm, $d_{50}$=22 nm, $d_{90}$=28 nm, surface-modified with methacrylate silane coupling agent) was dispersed in n-BA 3 (normal butyl acetate) in an amount of 50% by weight (hereinafter, referred to as S1 dispersion solution), and 50 g of a solution in which a silica particle S2 ($d_{10}$=29 nm, $d_{50}$=51 nm, $d_{90}$=74 nm, surface-modified with an acrylate silane coupling agent) was dispersed in MEK in an amount of 30% by weight (hereinafter, referred to as S2 dispersion solution) were mixed with the resulting acrylate solution to prepare a coating composition.

The coating composition was coated onto both surfaces of a polyimide substrate (size: 20 cm×30 cm, thickness: 35 μm) having an elastic modulus value of 6.0 GPa as measured according to ASTM D882 by a bar coating method, and photo-cured with a metal halide lamp having a wavelength of 290 to 320 nm to form a coating layer.

After the curing was completed, the thickness of the coating layer formed on both surfaces was 6 μm, respectively.

Example 2

The coating layer was formed in the same manner as in Example 1, except that the S2 dispersion solution was used in an amount of 83.3 g of and no additional methyl ethyl ketone solvent was contained.

Example 3

In Example 1, 25 g of methyl ethyl ketone was used, and 37.5 g of a solution in which a silica particle S3 ($d_{10}$=108 nm, $d_{50}$=119 nm, $d_{90}$=131 nm, surface-modified with an acrylate silane coupling agent) was dispersed in MEK in an amount of 40% by weight (hereinafter, referred to as S3 dispersion solution) was mixed instead of 50 g of the S2 dispersion solution to prepare a coating composition.

The subsequent steps were carried out in the same manner as in Example 1 to form a coating layer.

Example 4

20 g of TMPTA (manufactured by Cytec, Mw=296 g/mol, acrylate group equivalent weight=99 g/mol), 40 g of MU9800 (manufactured by Miwon, Mw=3500 g/mol, acrylate group equivalent weight=389 g/mol), 40 g of MU9020 (manufactured by Miwon, Mw=4500 g/mol, acrylate group equivalent weight=450 g/mol), 1 g of Irgacure 184 (manufactured by Ciba) as a photoinitiator and 12 g of methylethyl ketone (MEK) were mixed to prepare an acrylate solution.

60 g of the S1 dispersion solution and 75 g of the S3 dispersion solution were mixed with the resulting acrylate solution to prepare a coating composition.

The subsequent steps were carried out in the same manner as in Example 1 to form a coating layer.

Example 5

30 g of TMPTA (manufactured by Cytec, Mw=296 g/mol, acrylate group equivalent weight=99 g/mol), 30 g of MU9020 (manufactured by Miwon, Mw=4500 g/mol, acrylate group equivalent weight=450 g/mol), 40 g of SC 2152

(manufactured by Miwon, Mw=20,000 g/mol, acrylate group equivalent weight=1,333 g/mol) as a 15-functional urethane acrylate-based binder, 1 g of Irgacure 184 (manufactured by Ciba) as a photoinitiator, and 42 g of methyl ethyl ketone (MEK) were mixed to prepare an acrylate solution.

60 g of the S1 dispersion solution and 83.3 g of the S2 dispersion solution were mixed with the resulting acrylate solution to prepare a coating composition.

The subsequent steps were carried out in the same manner as in Example 1 to form a coating layer.

Comparative Example 1

The coating layer was formed in the same manner as in Example 1, except that methyl ethyl ketone was used in an amount of 55 g and a silica particle was not contained in the coating composition.

Comparative Example 2

The coating layer was formed in the same manner as in Example 1, except that methyl ethyl ketone was used in an amount of 12 g and only a solution in which a silica particle S4 ($d_{10}$=12 nm, $d_{50}$=17 nm, $d_{90}$=21 nm, surface-modified with an acrylate silane coupling agent) was dispersed in MEK (hereinafter, referred to as S4 dispersion solution) was used in an amount of 112.5 g.

Comparative Example 3

The coating layer was formed in the same manner as in Example 1, except that methyl ethyl ketone was used in an amount of 35 g and only a S1 dispersion solution was contained in an amount of 110 g.

Comparative Example 4

The coating layer was formed in the same manner as in Example 1, except that a S3 dispersion solution was used in an amount of 125 g, a S4 dispersion solution in an amount of 25 g, and an additional methyl ethyl ketone solvent was not contained.

Comparative Example 5

Except for using 70 g of PS610 (manufactured by Miwon, Mw=5,400 g/mol, acrylate group equivalent weight=900 g/mol) as a 6-functional polyester acrylate-based binder instead of MU9800 and MU9020 in Comparative Example 3, the other steps were carried out in the same manner as in Comparative Example 3 to form a coating layer.

The main components of the coating compositions of Examples 1 to 5 and Comparative Examples 1 to 5 are summarized Tables 1 and 2 below, respectively.

Figure 2:
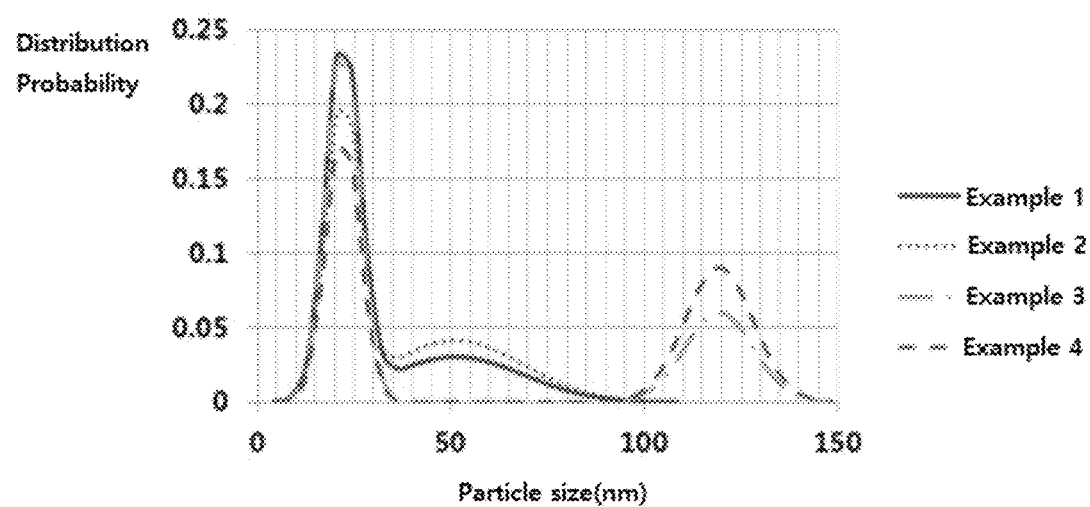
FIG. 2 is a graph showing the particle size distribution of the inorganic fine particles according to one embodiment of the present invention.
Figure 3:
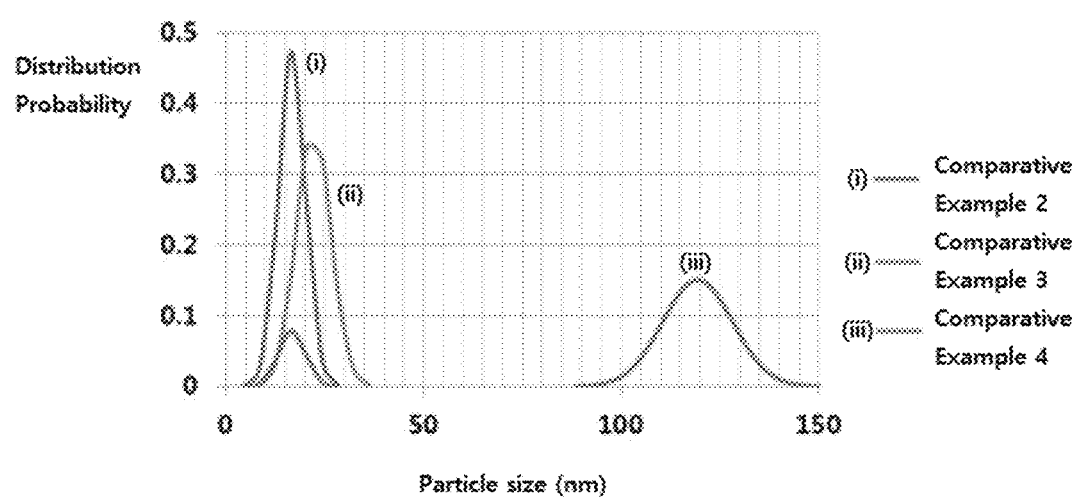
FIG. 3 is a graph showing the particle size distribution of the inorganic fine particles according to the comparative example of the present invention.

The particle size distribution graph of the entire inorganic fine particles contained in the coating compositions of Examples 1 to 4 is shown in FIG. 2, and the particle size distribution graph of the entire inorganic fine particles contained in the coating compositions of Comparative Examples 2 to 4 is shown in FIG. 3.

In Examples and Comparative Examples, the particle size distribution ($d_{10}$, $d_{50}$, $d_{90}$) of the inorganic fine particles was measured in the state of a dispersed solution using Malvern Zetasizer Nano-ZS 90 to determine a size distribution by number.

TABLE 1

| | | Example 1 | Example 2 | Example 3 | Example 4 | Example 5 |
|---|---|---|---|---|---|---|
| Acrylate based binder (unit: g) | TMPTA | 30 | 30 | 30 | 20 | 30 |
| | MU9800 | 40 | 40 | 40 | 40 | — |
| | MU9020 | 30 | 30 | 30 | 40 | 30 |
| | SC2152 | — | — | — | — | 40 |
| Inorganic fine particles* (unit: g) | S1 | 30 | 30 | 30 | 30 | 30 |
| | S2 | 15 | 25 | — | — | 25 |
| | S3 | — | — | 15 | 30 | — |
| | S4 | — | — | — | — | — |

TABLE 2

| | | Comparative Example 1 | Comparative Example 2 | Comparative Example 3 | Comparative Example 4 | Comparative Example 5 |
|---|---|---|---|---|---|---|
| Acrylate based binder (unit: g) | TMPTA | 30 | 30 | 30 | 30 | 30 |
| | MU9800 | 40 | 40 | 40 | 40 | — |
| | MU9020 | 30 | 30 | 30 | 30 | — |
| | PS610 | — | — | — | — | 70 |
| Inorganic fine particles* (unit: g) | S1 | — | — | 55 | — | 55 |
| | S2 | — | — | — | — | — |
| | S3 | — | — | — | 50 | — |
| | S4 | — | 45 | — | 10 | — |

*In Table 1 and 2, the content of the inorganic fine particles is represented by the net weight of only the inorganic fine particles (S1 to S4) excluding the solvent according to the weight percentage of the inorganic fine particles dispersed in the solvent.

Experimental Example

<Measurement Method>
1) Pencil Hardness

The maximum hardness without scratches was confirmed after moving the pencil back and forth three times at an angle of 45 degrees under a load of 750 g using a pencil hardness tester in accordance with standard JIS K5400-5-4.

2) Transmittance and Haze

The transmittance and haze were measured using a spectrophotometer (apparatus name: COH-400).

3) Bending Test

Each film was interposed and wound between cylindrical mandrels of various diameters and then the minimum diameter at which no cracks occurred was measured.

4) Bending Durability Test

Each of the films of Examples and Comparative Examples was cut, but laser cutting was performed into a size of 80×140 mm so as to minimize fine cracks at the edge portions. The laser cut film was placed on the measuring equipment and set so that the interval between the folded portions was 4 mm. Then, processes of folding and spreading both sides of the films at 90 degrees toward the bottom surface at room temperature were repeated 10,000 times by continuous operations (the speed at which the film was folded was once every 1.5 seconds)

After repeating 10,000 times, the film was peeled off, and it was observed whether or not cracks of 3 mm or more in length occurred (OK, NG). When cracks did not occur, the film was again bended 10,000 times and whether or not cracks occurred was repeatedly observed, thereby measuring the maximum number of repetitions that cracks do not occur. When cracks did not occur up to 100,000 times of repetitions, the bending durability was judged to be excellent.

5) Bending Stability Test

Similarly to the bending durability test, each of the films of Examples and Comparative Examples was cut, but laser cutting was performed into a size of 80×140 mm so as to minimize fine cracks at the edge portions.

The laser cut film was placed on the fixing device and set so that the interval between the folded portions was 4 mm. Then, the film was allowed to stand at room temperature for 24 hours while both sides of the film being folded at 90 degrees to the bottom of the film. The film was then peeled off and the film was turned over so that the folded portion went downward. The ⊔-shaped SUS structure was placed thereon and the film was fixed. The 3D image of the film shape was measured with a noncontact-type surface roughness measuring instrument (PLUTO 681, Dukin Co., Ltd., use of 605 nm laser, resolution 0.1 μm), and the maximum height of the height Z lifted from the bottom was measured as the bending stability property.

6) Recovery Test

In order to measure the recovery of the films, the films in which the bending durability and stability properties were measured were allowed to stand at room temperature for 1 hour, and the maximum value of the lifted height Z was again measured according to 5) bending stability test method. The change in the appearance of the folded portion was visually observed.

If Z is 0.1 mm or less and appearance change such as traces of folded parts is insufficient, it is shown as OK, and if Z exceeds 0.1 mm or a large number of traces remain on the folded portions, it is shown as NO.

The measurement results of the physical properties are shown in Tables 3 and 4 below.

TABLE 3

|  | Example 1 | Example 2 | Example 3 | Example 4 | Example 5 |
|---|---|---|---|---|---|
| Pencil hardness | 7H | 8H | 7H | 8H | 6H |
| Haze | 0.4% | 0.3% | 0.4% | 0.4% | 0.4% |
| Transmittance | 91.9% | 91.8% | 92.0% | 91.9% | 91.7% |
| Bending test | 4 mm | 4 mm | 4 mm | 4 mm | 3 mm |
| Bending durability | 100,000 times OK | 100,000 times OK | 100,000 times OK | 100,000 times OK | 100,000 times OK |
| Bending stability | 0.2 mm | 0.2 mm | 0.2 mm | 0.2 mm | 0.1 mm |
| Recovery | OK | OK | OK | OK | OK |

TABLE 4

|  | Comparative Example 1 | Comparative Example 2 | Comparative Example 3 | Comparative Example 4 | Comparative Example 5 |
|---|---|---|---|---|---|
| Pencil hardness | 4H | 5H | 8H | 5H | 8H |
| Haze | 0.2% | 0.3% | 0.4% | 0.4% | 0.3% |
| Transmittance | 92.1% | 91.9% | 91.8% | 91.8% | 92.0% |
| Bending test | 3 mm | 4 mm | 5 mm | 4 mm | 8 mm |
| Bending durability | 100,000 times OK | 100,000 times OK | NG (10,000 times) | 100,000 times OK | NG (10,000 times) |
| Bending stability | 0.1 mm | 0.2 mm | Unmeasurable | 0.3 mm | Unmeasurable |
| Recovery | OK | OK | NG | OK | NG |

Referring to Tables 1 to 4, the films prepared by using the coating composition of the present invention exhibited excellent characteristics in terms of each physical property, and showed excellent durability and stability in bending tests including high hardness. On the other hand, the films of Comparative Examples had lowered pencil hardness or did not exhibit sufficient bending durability and stability to be suitable for flexible films.

What is claimed is:

1. A coating composition comprising:
a 3- to 6-functional acrylate-based binder;
a 7- to 20-functional urethane acrylate-based binder;
a photoinitiator; and inorganic fine particles having a bimodal particle size distribution including a first inorganic fine particle group having $d_{50}$ of 20 to 35 nm and a second inorganic fine particle group having $d_{50}$ of 40 to 130 nm, and wherein the first inorganic fine particle group has a $d_{10}$ of 10 to 19 nm and a $d_{90}$ of 25 to 45 nm, and the second inorganic fine particle group has a $d_{10}$ of 25 to 110 nm and a $d_{90}$ of 60 to 150 nm.

2. The coating composition according to claim 1, wherein the 7- to 20-functional urethane acrylate-based binder has an acrylate equivalent weight of 200 to 1,500 g/mol.

3. The coating composition according to claim 1, wherein the weight ratio between the 3- to 6-functional acrylate-based binder and the 7- to 20-functional urethane acrylate-based binder is 1:9 to 4:6.

4. The coating composition according to claim 1, wherein the coating composition includes the 3- to 6-functional acrylate-based binder in an amount of 10 to 50 parts by weight, the 7- to 20-functional urethane acrylate-based binder in an amount of 40 to 70 parts by weight, the first inorganic fine particle group in an amount of 5 to 50 parts by weight, the second inorganic fine particle group in an amount of 5 to 50 parts by weight and the photoinitiator in an amount of 0.1 to 5 parts by weight, based on 100 parts by weight of the coating composition.

5. The coating composition according to claim 1, wherein the first inorganic fine particle group and the second inorganic fine particle group are the same or different and each independently surface-modified with any one or more silane coupling agents selected from the group consisting of (meth)acrylsilane, methacroxysilane, vinylsilane, epoxysilane, and mercaptosilane.

6. The coating composition according to claim 1, wherein the weight ratio between the first inorganic fine particle group and the second inorganic fine particle group is 9:1 to 3:7.

7. The coating composition according to claim 1, wherein the coating composition is formed on at least one surface of a support substrate to prepare of a flexible plastic film, wherein cracks of 3 mm or more in length do not occur in the flexible plastic film when the flexible plastic film is wound on a cylindrical mandrel with a diameter of 4 mm.

* * * * *